US012650022B2

(12) United States Patent　　(10) Patent No.: US 12,650,022 B2

Junker　　(45) Date of Patent: Jun. 9, 2026

(54) BLADE ACCESS ARRANGEMENT FOR A ROTOR BLADE OF A WIND POWER PLANT

(71) Applicant: PP Energy APS, Nordborg (DK)

(72) Inventor: Peter Moos Junker, Nordborg (DK)

(73) Assignee: PP ENERGY APS, Nordborg (DK)

( * ) Notice: Subject to any disclaimer, the term of this patent is extended or adjusted under 35 U.S.C. 154(b) by 434 days.

(21) Appl. No.: 17/639,381

(22) PCT Filed: Sep. 3, 2020

(86) PCT No.: PCT/EP2020/074687

§ 371 (c)(1),
(2) Date: Mar. 1, 2022

(87) PCT Pub. No.: WO2021/043947

PCT Pub. Date: Mar. 11, 2021

(65) Prior Publication Data

US 2022/0325536 A1　　Oct. 13, 2022

(30) Foreign Application Priority Data

Sep. 5, 2019　(DK) .................................. 201901052

(51) Int. Cl.
E04G 3/24　　(2006.01)
F03D 80/50　　(2016.01)

(52) U.S. Cl.
CPC .............. E04G 3/243 (2013.01); F03D 80/50 (2016.05)

(58) Field of Classification Search
CPC ....... E04G 3/243; F03D 80/50; F05B 2230/61
See application file for complete search history.

(56) References Cited

U.S. PATENT DOCUMENTS

| | | | |
|---|---|---|---|
| 1,658,670 A | | 2/1928 | Corbett |
| 2,118,330 A | * | 5/1938 | Tarof ..................... E01D 19/06 |
| | | | 14/73.1 |
| 3,121,470 A | | 2/1964 | Stone et al. |
| 3,452,764 A | | 7/1969 | Bell |
| 3,991,583 A | | 11/1976 | Scurlock |

(Continued)

FOREIGN PATENT DOCUMENTS

| CN | 107035630 B | 3/2019 |
|---|---|---|
| CN | 111173692 A | 5/2020 |

(Continued)

OTHER PUBLICATIONS

International Search Report for PCT/EP2020/074687 Dated Nov. 23, 2020.

(Continued)

*Primary Examiner* — Moshe Wilensky

(74) *Attorney, Agent, or Firm* — McCormick, Paulding & Huber PLLC

(57) ABSTRACT

A blade access arrangement for a rotor blade of a wind power plant is described, the arrangement including a platform (1) having at least two sub-platforms (3, 4, 5, 6) which are moveably connected to each other by means of a connecting arrangement. In such a platform the sub-platforms should keep a predetermined orientation to the rotor blade. To this end the connection arrangement comprises at least two connectors (9, 10), the connectors (9, 10) having the same length and at least at their ends the same distance to each other.

16 Claims, 2 Drawing Sheets

(56)  References Cited

U.S. PATENT DOCUMENTS

| | | | |
|---|---|---|---|
| 4,620,612 | A | 11/1986 | Enoki et al. |
| 4,821,844 | A | 4/1989 | Huffman et al. |
| 5,038,889 | A | 8/1991 | Jankowski |
| 7,134,444 | B2 | 11/2006 | Mintie et al. |
| 8,033,791 | B1 | 10/2011 | Watanabe |
| 8,043,022 | B2 | 10/2011 | Chau |
| 8,062,431 | B2 | 11/2011 | Kumar et al. |
| 8,397,382 | B2 | 3/2013 | Anasis et al. |
| 8,490,749 | B2 | 7/2013 | Teichert |
| 8,500,403 | B2 | 8/2013 | Grabau |
| 8,720,058 | B2 | 5/2014 | Anasis et al. |
| 9,447,601 | B2 | 9/2016 | Maillis et al. |
| 9,714,642 | B2 | 7/2017 | Teichert |
| 9,828,787 | B1 | 11/2017 | Thiessen |
| 10,352,062 | B2 | 7/2019 | Fletcher |
| 10,704,288 | B2 | 7/2020 | Fletcher |
| 10,718,317 | B2 | 7/2020 | Jamuna |
| 10,801,220 | B2 | 10/2020 | Oowaku et al. |
| 10,927,816 | B2 | 2/2021 | Diget et al. |
| 11,525,435 | B2 | 12/2022 | Pedersen et al. |
| 11,686,293 | B2 | 6/2023 | Danielsen et al. |
| 2006/0225960 | A1 | 10/2006 | Ferlin et al. |
| 2006/0291956 | A1 | 12/2006 | Chau |
| 2007/0007074 | A1 | 1/2007 | Vemuri et al. |
| 2008/0302605 | A1 | 12/2008 | St-Germain et al. |
| 2010/0129229 | A1 | 5/2010 | Grabau |
| 2010/0132738 | A1 | 6/2010 | Kumar et al. |
| 2011/0024233 | A1* | 2/2011 | Lott ........................ F03D 80/50 |
| | | | 182/129 |
| 2011/0140437 | A1* | 6/2011 | Vemuri ................... F03D 13/20 |
| | | | 290/55 |
| 2011/0167633 | A1 | 7/2011 | Anasis et al. |
| 2011/0303488 | A1 | 12/2011 | Besselink et al. |
| 2011/0318496 | A1 | 12/2011 | Jensen et al. |
| 2012/0168252 | A1 | 7/2012 | Bogaert |
| 2016/0222692 | A1 | 8/2016 | Maillis et al. |
| 2017/0030327 | A1 | 2/2017 | Fletcher |
| 2019/0010714 | A1 | 1/2019 | Oowaku et al. |
| 2019/0136836 | A1 | 5/2019 | Sanderson |
| 2019/0162172 | A1 | 5/2019 | Fletcher |
| 2019/0257295 | A1 | 8/2019 | Müller et al. |
| 2020/0171552 | A1 | 6/2020 | Hamamura et al. |
| 2023/0108569 | A1 | 4/2023 | Canal Vila et al. |
| 2023/0407850 | A1 | 12/2023 | Martensen et al. |

FOREIGN PATENT DOCUMENTS

| | | | |
|---|---|---|---|
| CN | 115949557 | B | 12/2023 |
| DE | 4336016 | A1 | 4/1995 |
| DE | 19909698 | C2 | 6/2001 |
| DE | 10118906 | A1 | 11/2002 |
| DE | 202004016460 | U1 | 12/2004 |
| DE | 202009002054 | U1 | 6/2009 |
| DE | 102008019680 | A1 | 11/2009 |
| DE | 102010011365 | A1 | 9/2011 |
| DE | 102011100912 | A1 | 3/2012 |
| DE | 102012001725 | A1 | 8/2013 |
| DE | 202016106250 | U1 | 11/2016 |
| EP | 0906483 | A1 | 4/1999 |
| EP | 1115644 | A1 | 7/2001 |
| EP | 1706636 | A2 | 10/2006 |
| EP | 2414671 | A1 | 2/2012 |
| EP | 2565440 | A2 | 3/2013 |
| EP | 2718561 | A2 | 4/2014 |
| EP | 2957538 | A1 | 12/2015 |
| EP | 1604108 | B1 | 5/2017 |
| EP | 3027900 | B1 | 1/2019 |
| EP | 3438375 | A1 | 2/2019 |
| EP | 3455005 | A1 | 3/2019 |
| EP | 3485162 | A1 | 5/2019 |
| EP | 3538797 | B1 | 9/2020 |
| EP | 3791066 | B1 | 6/2022 |
| EP | 4215747 | A1 | 7/2023 |
| EP | 4237685 | A1 | 9/2023 |
| EP | 4367395 | A1 | 5/2024 |
| GB | 2283046 | A | 4/1995 |
| GB | 2518701 | A | 4/2015 |
| GB | 2540900 | B | 10/2017 |
| KR | 20140099339 | A | 8/2014 |
| NL | 1030193 | C1 | 4/2007 |
| WO | WO9748863 | A1 | 12/1997 |
| WO | WO00/17086 | A1 | 3/2000 |
| WO | 2004081373 | A2 | 9/2004 |
| WO | WO2005/064152 | A2 | 7/2005 |
| WO | WO2007033671 | A1 | 3/2007 |
| WO | 2009121792 | A2 | 10/2009 |
| WO | WO2010112032 | A1 | 10/2010 |
| WO | WO2012167788 | A2 | 12/2012 |
| WO | 2013102460 | A1 | 7/2013 |
| WO | WO2015155507 | A1 | 10/2015 |
| WO | WO2017194940 | A1 | 11/2017 |
| WO | 2017215711 | A1 | 12/2017 |
| WO | WO2018010749 | A1 | 1/2018 |
| WO | WO2018086655 | A1 | 5/2018 |
| WO | WO2020058099 | A1 | 3/2020 |
| WO | WO2020156622 | A1 | 8/2020 |
| WO | WO2021242158 | A1 | 12/2021 |
| WO | WO2022093027 | A1 | 5/2022 |
| WO | WO2023280361 | A1 | 1/2023 |

OTHER PUBLICATIONS

International Search Report for PCT/EP2020/074686 Dated Nov. 13, 2020.

International Search Report for PCT/EP2021/081137 dated Jan. 21, 2022.

International Search Report for PCT/EP2019/074435 dated Dec. 17, 2019.

Extended European Search Report for European Pat. App. No. 20206653.6 dated Apr. 20, 2021.

International Search Report mailed Apr. 17, 2023, in connection with corresponding International Application No. PCT/EP2023/050796; 3 pages.

International Search Report and Written Opinion dated Jun. 5, 2015 from International Patent Application No. PCT/GB2015/051003, filed Mar. 31, 2015.

International Preliminary Report on Patentability dated Oct. 12, 2016 from International Patent Application No. PCT/GB2015/051003, filed Mar. 31, 2015.

\* cited by examiner

BLADE ACCESS ARRANGEMENT FOR A ROTOR BLADE OF A WIND POWER PLANT

This application is a National Stage application of International Patent Application No. PCT/EP2020/074687, filed on Sep. 3, 2020, which claims priority to Danish Application No. 201901052 filed on Sep. 5, 2019, each of which is hereby incorporated by reference in its entirety.

TECHNICAL FIELD

The present invention relates to a blade access arrangement for a rotor blade of a wind power plant, the arrangement comprising a platform having at least two sub-platforms which are moveably connected to each other by means of a connecting arrangement.

BACKGROUND

Such a blade access arrangement is known, for example, from EP 1 604 108 B1.

The sub-platforms are connected by means of swivel joints and surround an opening through which a rotor blade can be accommodated. When the shape of the platform is changed, the angular relation of the sub-platforms with respect to the rotor blade is changed.

SUMMARY

An object underlying the invention is to keep a predetermined orientation of the sub-platforms to the rotor blade.

This object is solved with a blade access arrangement as described at the outset in that the connecting arrangement comprises at least two parallel connectors, the connectors having the same length and at least at their ends the same distance to each other.

The connectors together with the sides of the sub-platforms to which they are connected form a parallelogram. When the two sub-platforms are moved in relation to each other in the same plane, the orientation of the sub-platforms is maintained.

In an embodiment of the invention at least one of the two sub-platforms form a trapezoid. The side of the trapezoid of the sub-platform facing the side of another sub-platform to which the connectors are connected is parallel to this side.

In an embodiment of the invention the two sub-platforms comprise sides which are perpendicular to each other. The sub-platforms are arranged in a perpendicular relation, so that the shape of the platform can be defined very precisely.

In an embodiment of the invention an actuator is arranged between one of the sub-platforms and one of the connectors. When the actuator is actuated, an angle between the connector and the corresponding sub-platform is changed which in turn leads to a corresponding movement of the other sub-platform in relation to the first mentioned platform.

In an embodiment of the invention a space between the two sub-platforms is covered by a decking having a variable width. Thus, an operator using the platform for inspecting, maintaining or repairing a blade can walk over the decking. Since the decking has a variable width, the width can be adapted to the width of the parallelogram. This width changes during a movement of the two sub-platforms in relation to each other.

In an embodiment of the invention the decking comprises a plurality of slats spaced apart from each other. When the width of the decking is varied, the width of the spaces between the slats is varied. It is possible to choose the width of the slat and the corresponding width of the space between the slats so that in all possible configurations the decking can support the operator.

In an embodiment of the invention the slats are arranged in parallel to the connectors. Since the above-mentioned parallelogram comprises a length which is larger than the width, the use of slats extending in the lengthwise direction produces less costs and at the same time a sufficient stability.

In an embodiment of the invention the lamellas are supported by supports ex-tended from the connectors, wherein the supports are connected alternately to one connector and to another connector. The support bridge the distance between the connectors in all possible configurations of the sub-platforms in relation to each other and the slats are sufficiently supported.

In an embodiment of the invention at least four sub-platforms are provided, the sub-platforms surrounding an opening. The opening can be used to accommodate a blade of the rotor of the windmill which has to be inspected, maintained or repaired.

In an embodiment of the invention one sub-platform comprises two sub-platform parts. The sub-platform parts can be moved away from each other to open the opening, so that the platform can be moved from the tower side of the blade to the blade. This can be done at a height of the tower of the windmill in which the distance between the tower and the blade is small enough. Thus, it is not necessary to pass the tip of the blade through the opening. This is more challenging since the tip has a larger distance from the tower than a part of the blade which is nearer to the root.

In an embodiment of the invention the two sub-platform parts are detachably connected to each other. When the platform has been moved around the blade, the two sub-platform parts can be connected to form a stable closed loop around the blade.

In an embodiment of the invention each of the sub-platform parts is connected to another sub-platform by means of the connecting arrangement which in turn is connected to a common sub-platform by means of the connecting arrangement. In other words, the connection between the sub-platform part and another sub-platform is made by the above-mentioned arrangement of two parallel connectors having the same length and at least at their ends the same distance to each other. A similar connector arrangement can be used to connect the next sub-platform to the common sub-platform. Thus, when the two sub-platform parts are connected to each other it is necessary to actuate one actuator only in order to change the shape of the platform.

However, in an embodiment of the invention at least four actuators are provided. The four actuators can be used to handle all relevant sub-platforms and their parts of the platform in order to open the platform and to close it.

BRIEF DESCRIPTION OF THE DRAWINGS

An embodiment of the invention will now be described in more detail with reference to the drawing, wherein.

DETAILED DESCRIPTION

Figures 1, 2:
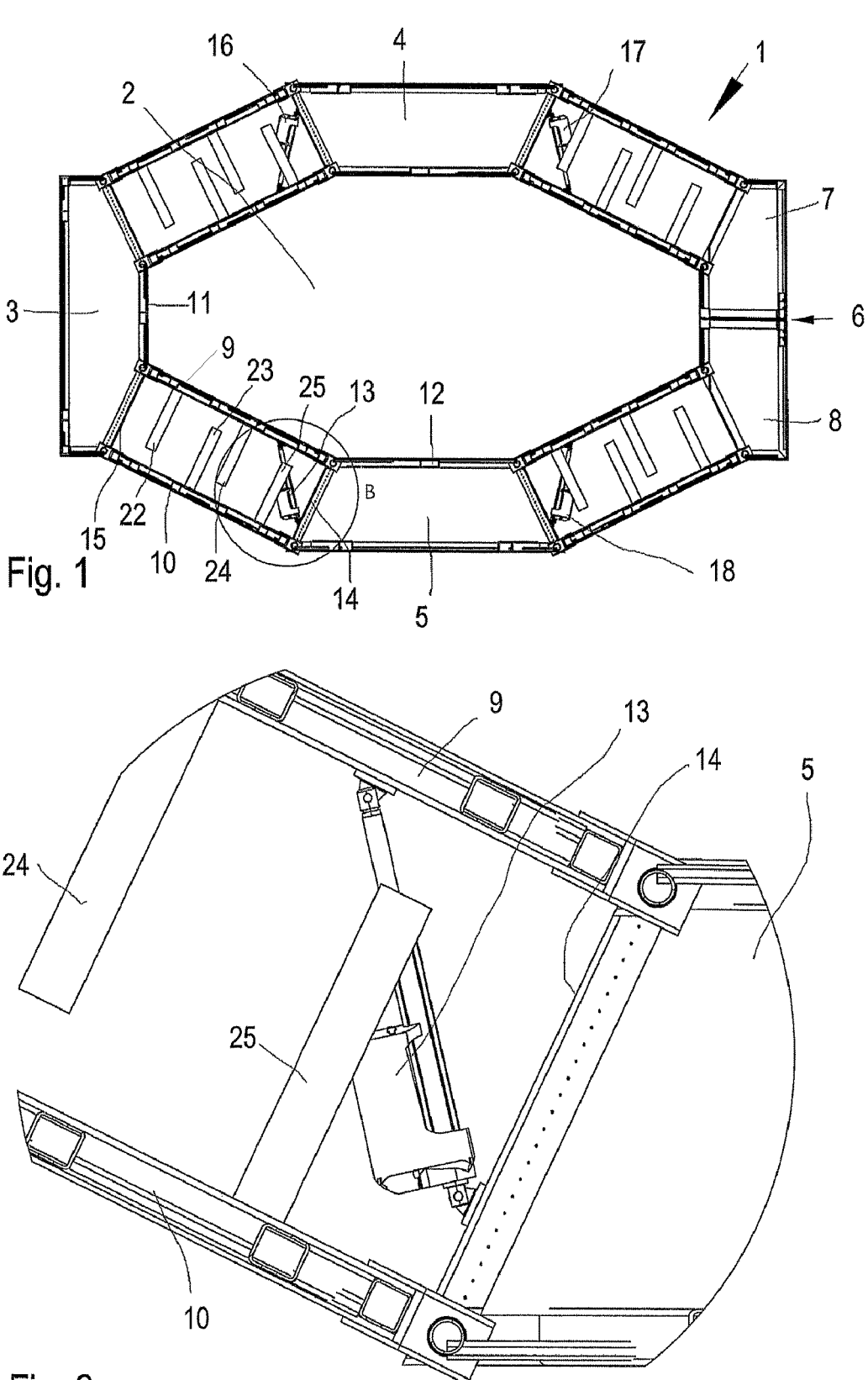
FIG. 1 shows a top view of a platform of a blade access arrangement.
FIG. 2 shows a detail B of FIG. 1.

FIG. 1 shows schematically a platform 1 of a blade access arrangement for a rotor blade of a wind power plant. The wind power plant or "windmill" is not shown in the drawing.

The platform comprises an opening 2 which is used to accommodate the blade, when access to the blade is necessary to inspect, maintain or repair the blade.

The platform 1 comprises four sub-platforms 3, 4, 5, 6, wherein the sub-platform 6 comprises two sub-platform parts 7, 8.

Two adjacent sub-platforms are connected by means of two parallel connectors 9, 10 which have the same length and the same distance to each other, at least at their ends.

The connectors 9, 10 are part of a connecting arrangement. The distance between the two connectors 9, 10 is the width of the connecting arrangement.

In the embodiment shown the connecting arrangement comprises two connectors 9, 10. It is, however, possible to use more than two connectors 9, 10.

As can be seen in FIG. 1, the connectors 9, 10 together with the sub-platforms 3, 5 which are connected by the connectors 9, 10 form a parallelogram. The sub-platform 3 comprises a side 11 and the sub-platform 5 comprises a side 12, wherein the sides 11, 12 are perpendicular to each other. This perpendicular orientation of the two sub-platforms 3, 5 is not changed when the sub-platforms 3, 5 are moved in relation to each other.

Movement of the sub-platforms 3, 5 in relation to each other can be caused by actuating an actuator 13. The actuator 13 is arranged between the sub-platform 5 and the connector 9. The sub-platform 5 is in form of a trapezoid and the actuator 13 is connected to a side 14 of the trapezoid connecting two parallel sides of the trapezoid, one of which is the above-mentioned side 12.

The side 14 of the sub-platform 5 is always kept parallel to a side 15 of the sub-platform 3. When the actuator 13 is actuated, only an angle between the connectors 9, 10 and the respective sides 14, 15 is changed, however, not the angular orientation between the sub-platforms 3, 5.

When the two sub-platform parts 7, 8 of the sub-platform 6 are connected to each other, one actuator 13 is sufficient to change the form of the platform 1.

However, in order to catch the above-mentioned blade of the windmill, the opening 2 can be opened. To this end, the sub-platform parts 7, 8 are detachably connected to each other. In the configuration shown, the sub-platform parts 7, 8 are held together by the detachable connection. However, when the detachable connection is un-locked, the parts 7, 8 can be moved away from each other.

To this end further actuators 16, 17, 18 are provided. Actuator 16 can move the sub-platforms 3, 4 in relation to each other. Actuator 17 can move the sub-platform part 7 in relation to the sub-platform 4. Actuator 18 can move the sub-platform part 8 in relation to the sub-platform 5.

The sub-platforms 3, 4, 5, 6 form a walkable area, i.e. an operator is fully supported by each of the sub-platforms 3, 4, 5, 6.

Figure 3:
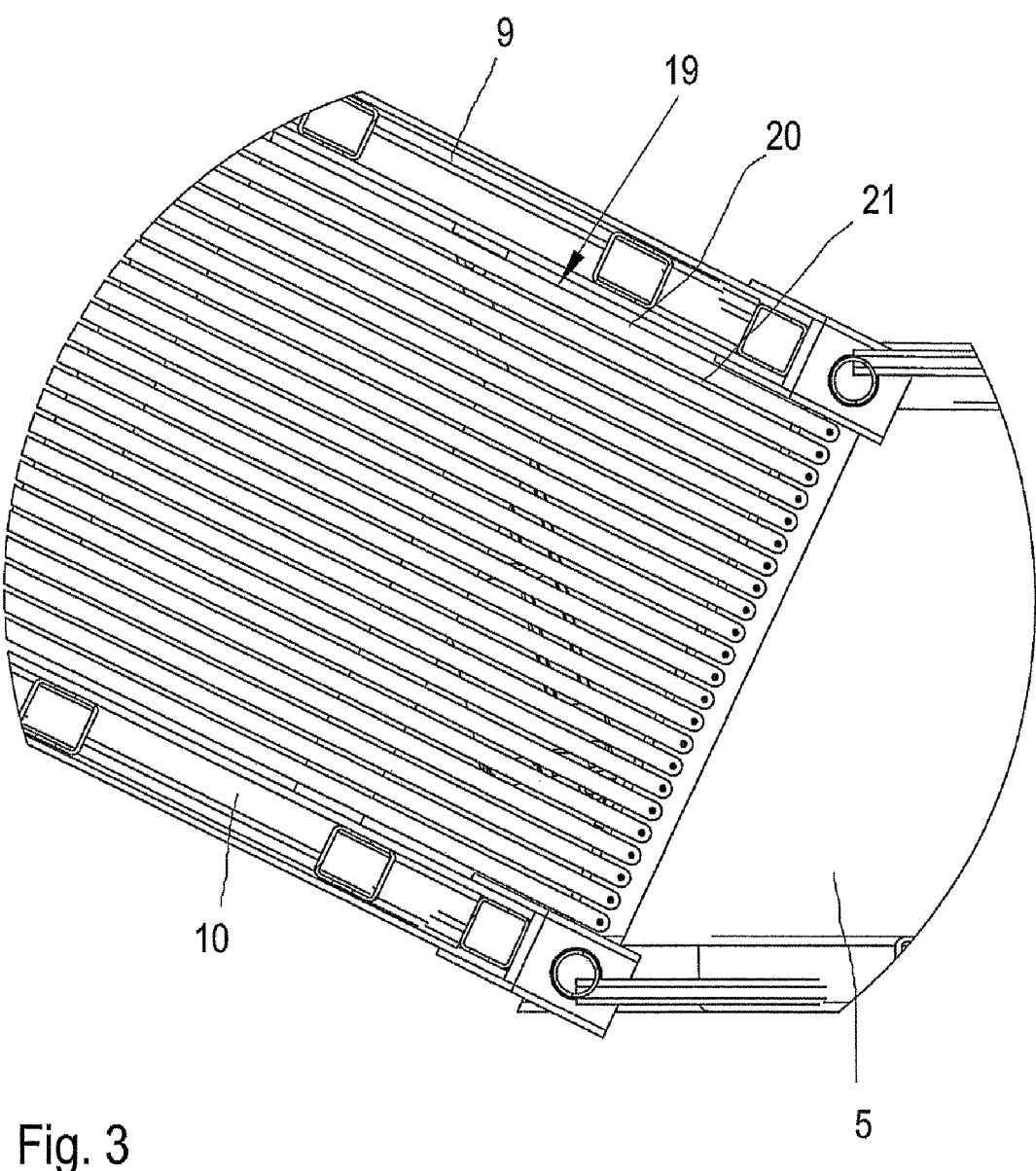
FIG. 3 shows the detail of FIG. 2 with a decking.

In order to make it possible that the operator can cross the distance between the respective sub-platforms 3-6, the spaces between each pair of sub-platforms 3, 4; 3, 5; 4, 6; 5, 6 is closed by a decking 19 (FIG. 3). The decking 19 comprises a plurality of slats 20 which are spaced apart from each other, i.e. a space 21 is arranged between adjacent lamellas 20. The slats 20 are arranged in parallel to the connectors 9, 10, i.e. in lengthwise direction of the space between the sub-platforms 3, 5. In other words, the slats 20 are directed in a direction from one sub-platform 3 to the other sub-platform 5. The same is true for the other pairs of sub-platforms.

When the sub-platforms 3, 5 are moved in relation to each other, the spaces 21 between the slats 20 vary their width.

The consequence is that the decking 19 in total has a variable width as well. The spaces 21 between the slats 20 are in any case so small that the decking 19 forms likewise a walkable floor.

The slats 20 are supported by supports 22-25, wherein one half of the supports 22-25 is connected to the connector 9 and the other half is connected to the connector 10.

The supports of the two halves are arranged alternately i.e. the support 22 is connected to the connector 9, the support 23 is connected to the support 10, the support 24 is connected to the support 9 and the support 25 is connected to the connector 10.

In order to access a blade of a windmill, the platform 1 is raised to a height in which the blade is close enough to the tower of the windmill, so that only a small movement of the platform 1 away from the tower is necessary to accommodate the blade in the opening 2. Before moving the platform 1 in a direction towards the blade, the parts 7, 8 of the sub-platform 6 are moved away from each other to bring the platform 1 in an open condition. Once the blade has entered the opening 2, the parts 7, 8 of the sub-platform 6 are again connected to each other.

In a region near the root of the blade the section of the blade approaches a circle. In order to adapt the form of the platform 1 to the form of the blade, the actuators 13, 16-18 are actuated to increase the distance between the sub-platforms 4, 5 and to minimize the distance between the sub-platforms 3, 6. When the platform 1 is moved downwardly to the tip of the blade, the actuators 13, 16-18 can be actuated as well to bring the platform 1 in the form shown in FIG. 1, in which the distance between the sub-platforms 3, 6 has been increased and the distance between the sub-platforms 4, 5 has been decreased.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A blade access arrangement for a rotor blade of a wind power plant, the arrangement comprising a platform having at least two sub-platforms which are movably connected to each other by means of a connecting arrangement, wherein the connecting arrangement comprises at least two connectors, the connectors having the same length and at least at their ends the same distance to each other, and wherein a space between the two sub-platforms and between the connectors is covered by a decking having a width defined between the connectors, and wherein the width changes when the sub-platforms are moved in relation to each other.

2. The blade access arrangement according to claim 1, wherein at least one of the two sub-platforms forms a trapezoid.

3. The blade access arrangement according to claim 1, wherein the two sub-platforms comprise sides which are perpendicular to each other.

4. The blade access arrangement according to claim 1, wherein an actuator is arranged between one of the sub-platforms and one of the connectors.

5. The blade access arrangement according to claim 1, wherein the decking comprises a plurality of slats spaced apart from each other.

6. The blade access arrangement according to claim 5, wherein the slats are directed in a direction from one sub-platform to the other sub-platform.

7. The blade access arrangement according to claim 5, wherein the slats are arranged in parallel to the connectors.

8. The blade access arrangement according to claim 5, wherein the slats are supported by supports extending from the connectors.

9. The blade access arrangement according to claim 8, wherein the supports are connected alternately to one connector and to another connector.

10. The blade access arrangement according to claim 1, wherein at least four sub-platforms are provided, the sub-platforms surrounding an opening.

11. The blade access arrangement according to claim 10, wherein one sub-platform comprises two sub-platform parts.

12. The blade access arrangement according to claim 11, wherein the two sub-platform parts are detachably connected to each other.

13. The blade access arrangement according to claim 11, wherein each of the sub-platform parts is connected to another sub-platform by means of the connecting arrangement which in turn is connected to another sub-platform by means of another connecting arrangement.

14. The blade access arrangement according to claim 10, wherein at least four actuators are provided.

15. A blade access arrangement for a rotor blade of a wind power plant, the arrangement comprising a platform having at least two sub-platforms which are movably connected to each other by means of a connecting arrangement, wherein the connecting arrangement comprises at least two parallel connectors, the connectors having the same length and at least at their ends the same distance to each other, wherein a space between the two sub-platforms is covered by a decking having a variable width, wherein the decking comprises a plurality of slats spaced apart from each other, wherein the slats are supported by supports extending from the connectors, and wherein the supports are connected alternately to one connector and to another connector.

16. A blade access arrangement for a rotor blade of a wind power plant, the arrangement comprising a platform having at least two sub-platforms which are movably connected to each other by means of a connecting arrangement, wherein the connecting arrangement comprises at least two connectors, the connectors having the same length and at least at their ends the same distance to each other, wherein a space between the two sub-platforms is covered by a decking having a variable width, wherein the decking comprises a plurality of slats, and wherein distances between the slats change when the sub-platforms are moved in relation to each other.

* * * * *